US012775915B2

(12) United States Patent
Shetty

(10) Patent No.: US 12,775,915 B2
(45) Date of Patent: Oct. 27, 2026

(54) DYNAMIC MEETING CREATION AND SCHEDULING

(71) Applicant: Omnissa, LLC, Mountain View, CA (US)

(72) Inventor: Rohit Pradeep Shetty, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 194 days.

(21) Appl. No.: 17/976,753

(22) Filed: Oct. 29, 2022

(65) Prior Publication Data

US 2024/0029029 A1 Jan. 25, 2024

(30) Foreign Application Priority Data

Jul. 22, 2022 (IN) ............................. 202241042038

(51) Int. Cl.

*G06Q 10/1093* (2023.01)
*G06F 40/289* (2020.01)
*G06Q 10/107* (2023.01)

(52) U.S. Cl.

CPC ....... *G06Q 10/1093* (2013.01); *G06F 40/289* (2020.01); *G06Q 10/107* (2013.01)

(58) Field of Classification Search

None
See application file for complete search history.

(56) References Cited

U.S. PATENT DOCUMENTS

| | | | | |
|---|---|---|---|---|
| 10,692,048 | B2 * | 6/2020 | Haines | G06F 16/35 |
| 11,553,008 | B1 * | 1/2023 | Robinson | H04L 63/105 |
| 2013/0144672 | A1 * | 6/2013 | Chakra | G06Q 10/10 705/7.16 |
| 2018/0032968 | A1 * | 2/2018 | Bryant | H04L 51/42 |
| 2018/0097767 | A1 * | 4/2018 | Ragsdale | H04L 51/226 |
| 2018/0234376 | A1 * | 8/2018 | Gray | H04L 51/42 |
| 2020/0279567 | A1 * | 9/2020 | Adlersberg | G06F 40/35 |
| 2023/0254291 | A1 * | 8/2023 | Milne | H04L 9/50 713/168 |
| 2023/0353651 | A1 * | 11/2023 | Maurer | H04L 67/54 |

FOREIGN PATENT DOCUMENTS

| | | | | |
|---|---|---|---|---|
| CN | 103440571 A | * | 12/2013 | G06Q 10/107 |
| CN | 117693746 A | * | 3/2024 | G06F 21/31 |
| EP | 2575315 A1 | * | 4/2013 | H04L 63/08 |
| WO | WO-2016191737 A2 | * | 12/2016 | G06F 3/016 |
| WO | WO-2018194573 A1 | * | 10/2018 | G06Q 10/109 |

OTHER PUBLICATIONS

Blum, Avrim. "Empirical support for winnow and weighted-majority algorithms: Results on a calendar scheduling domain." Machine Learning 26 (1997): 5-23. (Year: 1997).*

(Continued)

*Primary Examiner* — Thomas L Mansfield
(74) *Attorney, Agent, or Firm* — Kim & Stewart LLP

(57) ABSTRACT

Disclosed are various approaches for dynamically scheduling meetings for user groups. Users participating in an email thread can provide feedback regarding whether they would like for a meeting to be scheduled. A meeting service can automatically schedule a meeting based upon user feedback or an analysis of the email thread.

16 Claims, 6 Drawing Sheets

(56) References Cited

OTHER PUBLICATIONS

Schwartz-Ziv, Miriam, and Michael S. Weisbach. "What do boards really do? Evidence from minutes of board meetings." Journal of financial economics 108.2 (2013): 349-366. (Year: 2013).*
Benhassine, Ahlem, and Tu Bao Ho. "An agent-based approach to solve dynamic meeting scheduling problems with preferences." Engineering Applications of Artificial Intelligence 20.6 (2007): 857-873. (Year: 2007).*
Blum, Avrim. "Empirical support for winnow and weighted-majority algorithms: Results on a calendar scheduling domain." Machine Learning 26.1 (1997): 5-23. (Year: 1997).*
Bulteau, Laurent, et al. "Aggregation over metric spaces: Proposing and voting in elections, budgeting, and legislation." Journal of Artificial Intelligence Research 70 (2021): 1413-1439. (Year: 2021).*

* cited by examiner

DYNAMIC MEETING CREATION AND SCHEDULING

RELATED APPLICATIONS

Benefit is claimed under 35 U.S.C. 119(a)-(d) to Foreign Application Serial No. 202241042038 filed in India entitled "DYNAMIC MEETING CREATION AND SCHEDULING", on Jul. 22, 2022, by VMware, Inc., which is herein incorporated in its entirety by reference for all purposes.

BACKGROUND

Users in an enterprise environment often engage with one or more users over email. For instance, a user can engage with a group of users in an email thread discussing a topic before agreeing to scheduling an in-person or virtual meeting to further discuss and resolve any outstanding questions or issues. Users in large enterprises can often observe a high volume of emails to and from unfamiliar participants before the group finally agrees to schedule a call or meeting to resolve any outstanding issues or continue further discussion. This is especially the case when email threads involve users with limited or no past interaction history with one another. At different points during the email thread, certain participants might want to schedule a meeting to discuss and resolve issues. However, other users involved on the communication thread may feel it is premature to do so.

Conducting a meeting too early or too late might result in limited participation or general inefficiency in resolving questions or issues that necessitated the creation of the email thread. In some cases, some users may not engage or may not attend the meeting at all, believe that the meeting is a waste of time. Accordingly, there exists a need to create efficiencies in how meetings are scheduled in an enterprise.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to an architecture that dynamically generates meetings on behalf of a user group engaging in an email thread based upon user votes from the user group, an automated analysis of the context of the email thread, and potentially other factors discussed herein. Users in an enterprise environment often engage with one or more users over email. For instance, a user can engage with a group of users in an email thread discussing a topic before agreeing to scheduling an in-person or virtual meeting to further discuss and resolve any outstanding questions or issues. Users in large enterprises can often observe a high volume of emails to and from unfamiliar participants before the group finally agrees to schedule a call or meeting to resolve any outstanding issues or continue further discussion. This is especially the case when email threads involve users with limited or no past interaction history with one another. At different junctures during the email thread certain participants might want to schedule a meeting to discuss and resolve issues. However, other users involved on the communication thread may feel it is premature to do so.

Conducting a meeting to early or too late in the course of an email discussion might result in limited participation or general inefficiency in resolving questions or issues that necessitated the creation of the email thread. In some cases, some users may not engage or may not attend the meeting at all, believe that the meeting is a waste of time. Accordingly, there exists a need to create efficiencies in how meetings are scheduled in an enterprise.

Thus, organizing a meeting at an appropriate time in the life of an email thread that would be considered appropriate by a threshold percentage of user participants in the email thread can increase the chances of the meeting resulting in a productive outcome.

Figure 1:
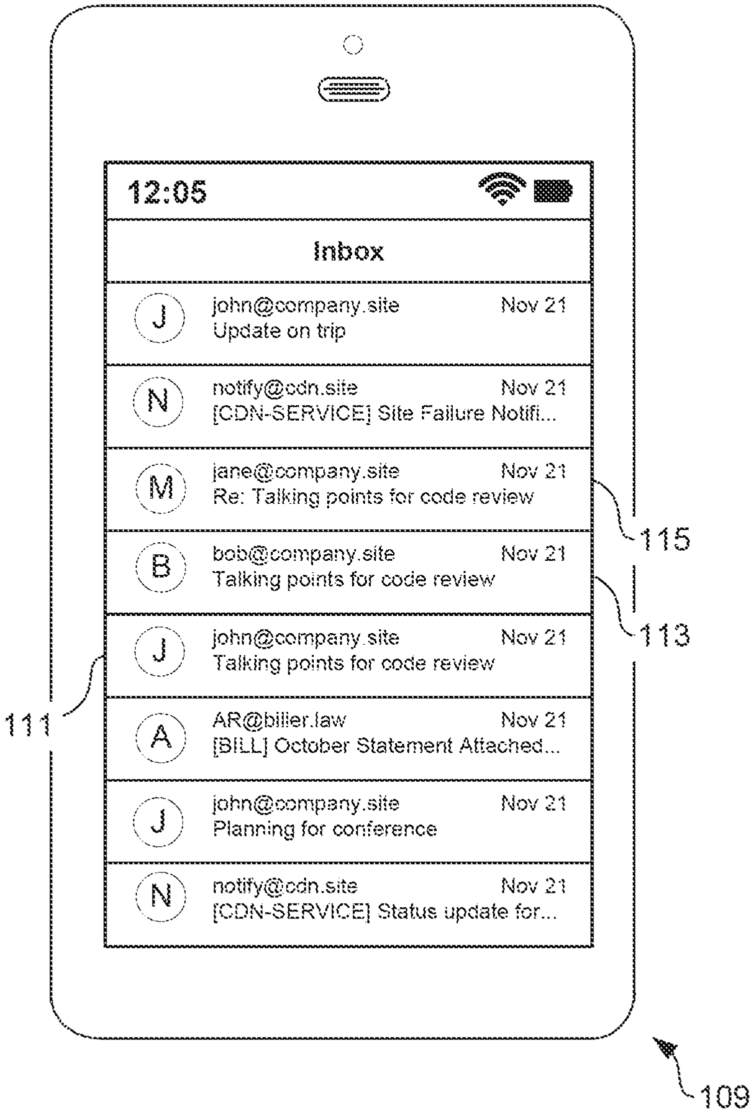
FIG. 1 depicts an example user interface illustrating various examples of the disclosure.

FIG. 1 illustrates an example of a mailbox view generated by an email client 109 according to one example of the disclosure. In the example of FIG. 1, the email client 109 can be executed by a client device that is enrolled as a managed device with a management service. The operating system of the client device can provide APIs that allow the client device to be enrolled as a managed device and provide the ability for a remotely executed management service, in coordination with a locally executed management component, to manage and oversee operation of the client device. Accordingly, the email client 109 can be installed as a managed application that is managed by the management service. However, in some examples of the disclosure, the email client 109 need not be enrolled as a managed device with the management service.

In the example of FIG. 1, the email client 109 can allow a user to view an inbox or other folders or view of an email archive or email account. In the example of FIG. 1, emails 111, 113, and 115 can be identified by the email client 109 as being associated with an email thread or an email discussion among a user group. The email client 109 can, in some examples, overlay a visual indicator linking the emails 111, 113, 115 together as an email thread. In other examples, the email client 109 can present the emails similarly to other emails that are not linked to an email thread. The email client 109 can identify the emails as a part of an email thread based upon common text in a subject of the email as well as a commonality in the recipients of the emails 111, 113, 115. For example, if multiple emails have a common distribution list and a common subject line, the emails can be considered as part of an email thread.

In the example shown in FIG. 1, the emails 111, 113, and 115 are from different senders but have a common subject line. The emails 111, 113, and 115 further have a common distribution list, or a user group that is participating in the email thread. Accordingly, the email client 109, or a meeting service 213 executing remotely from a device on which the email client 109 is running, can analyze emails associated with a user or a user group to determine that a collection of emails constitutes an email thread.

Figure 2:
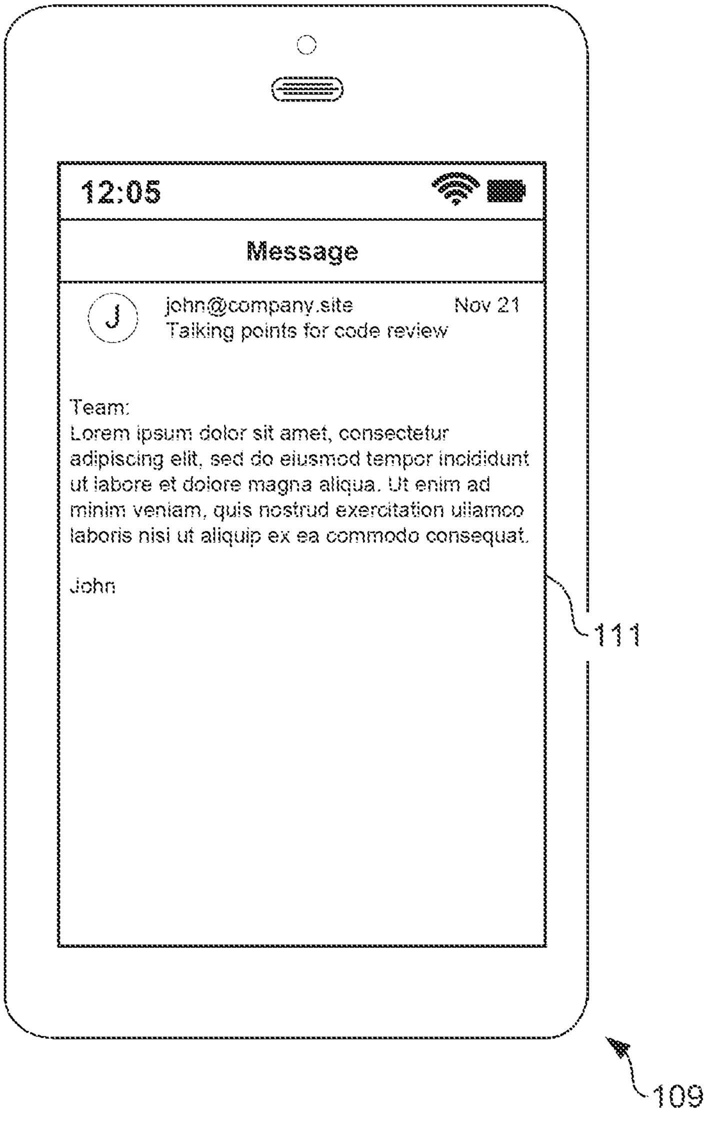
FIG. 2 depicts an example user interface illustrating various examples of the disclosure.

Accordingly, reference is now made to FIG. 2, which illustrates an example user interface generated by the email client 109. The user interface shown in FIG. 2 can be generated after a user selects an email 111 in the user interface shown in FIG. 1. As shown in FIG. 1, the email client 109 can render the email in the user interface. The email client 109 can also detect that the selected email is the first email in an email thread, which can be considered premature to solicit a user vote regarding whether to schedule a meeting to discuss the topics within the email thread.

In some examples, the decision to solicit a user vote can be made by the email client 109. In this scenario, the email client 109 can detect an email thread that is being viewed within the email client 109 can generate a user interface to solicit a vote once a user views second, third, or subsequent email in the email thread. In another example, the decision to solicit a vote can be made by the meeting service 213 or an email server hosting the email, which can instruct the email client 109 to render a user interface to obtain a user vote regarding whether to schedule a meeting about the email thread.

Figure 3:
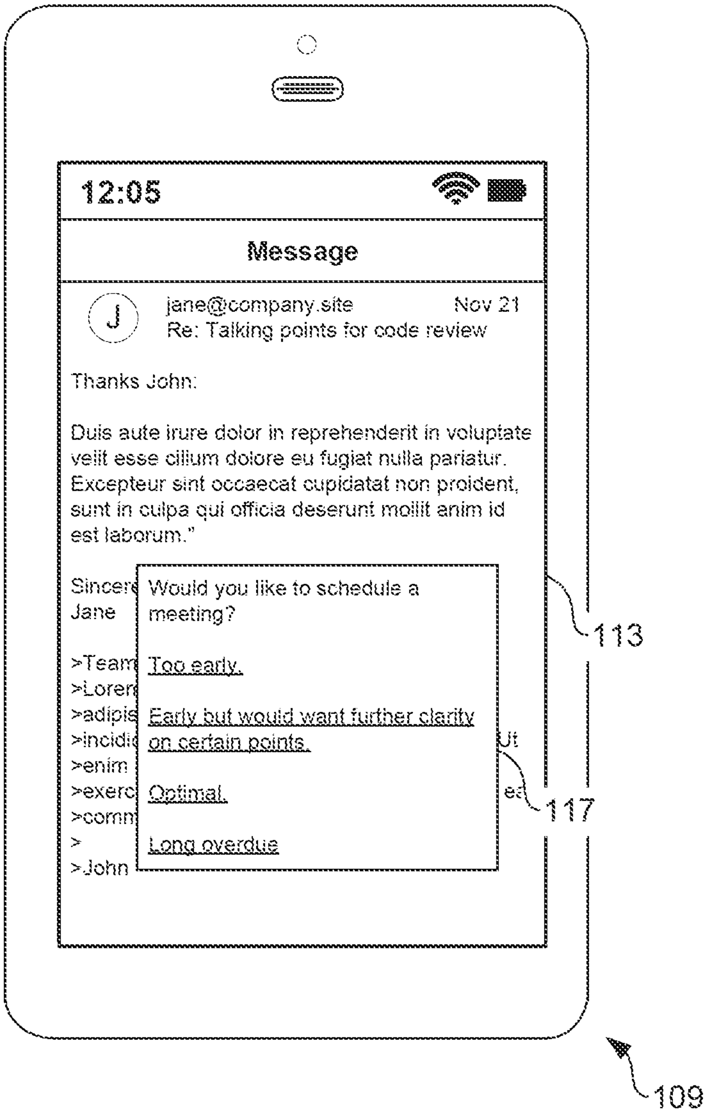
FIG. 3 depicts an example user interface illustrating various examples of the disclosure.

Continuing the example of FIG. 2, reference is now made to FIG. 3, which illustrates an example of a vote user interface element 117 that can be rendered by the email client 109 to obtain a user vote regarding whether the meeting service 213 should schedule a meeting about the email thread. In the example of FIG. 2, the email client 109 or meeting service 213 can detect that the email client 109 is displaying a second or subsequent email in an email thread. The email client 109 can display a vote user interface element 117 that can solicit a user vote regarding whether the user believes a meeting should be scheduled to discuss or resolve topics related to the email thread. In one example, respective email clients 109 of the various users in the user group who are copied on the email thread can be presented with a vote user interface element 117 to obtain their respective user votes.

The vote user interface element 117 can cause the email client 109 to transmit a vote of the user to the meeting service 213. In some examples, depending upon how the user votes, the vote user interface element 117 can solicit additional input from the user. For example, if the user indicates any inclination to hold a meeting, the vote user interface element 117 can solicit information from the user that can be used to generate a meeting agenda.

Figure 4:
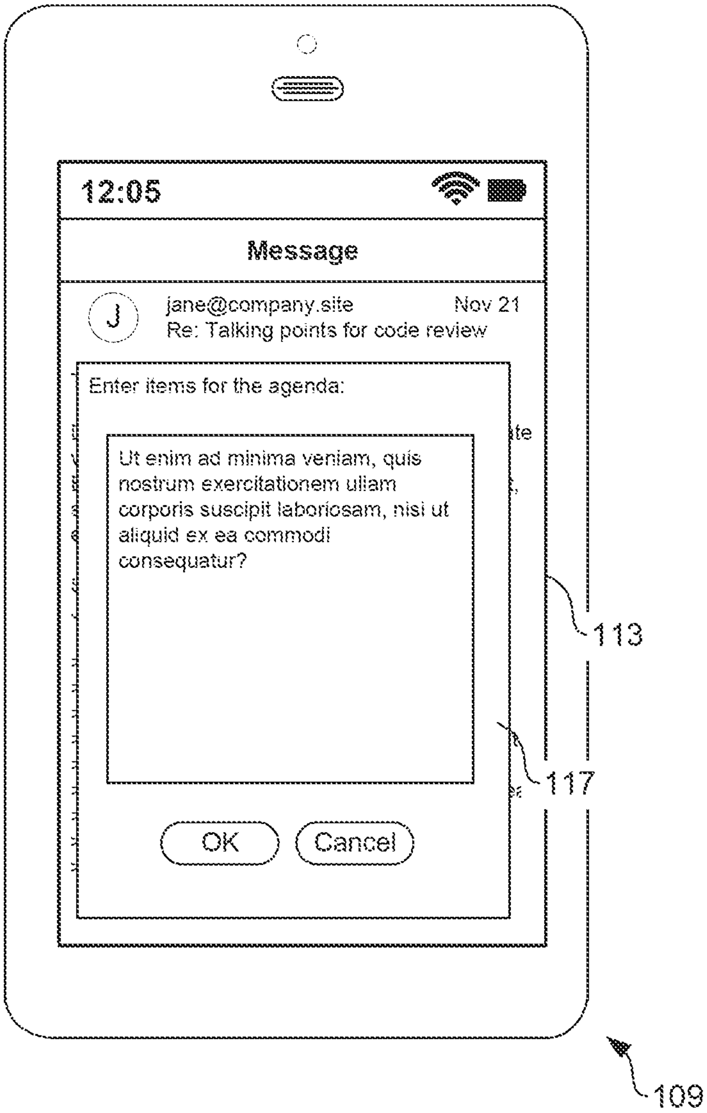
FIG. 4 depicts an example user interface illustrating various examples of the disclosure.

Reference is now made to FIG. 4, which continues the example of FIGS. 1-3. As shown in the FIG. 4, the vote user interface element 117 can also allow the user to input information from which a meeting agenda can be generated for a meeting for which the user is voting. In one example, unless the user votes that it is too early in the discussion of the email thread to hold a meeting, the vote user interface element 117 can solicit information from the user to be included within a meeting agenda or from which a meeting agenda can be automatically generated by the 213.

Accordingly, examples of the disclosure can automatically generate a meeting event within a calendar service and/or cause a meeting invitation to be sent to the user group participating in the email thread when a threshold percentage of users vote to hold a meeting.

Predicting an optimal time to have a meeting during the progression of a discussion over email can be important because some users prefer discussion over email to obtain further context rather than immediately conducting a meeting. In other cases, some users might prefer conducting a meeting sooner in the process of an email discussion Additionally, in some cases, meetings are scheduled without clear agendas. In enterprise situations, meetings can appear on a user's calendar without a clear agenda. In some cases, the agenda is loosely derived on the fly from the email thread by the host and might lead to situations where the agenda is dominated by the more vocal participants and lacks focus. Having a clearly decided agenda would help in meetings being focused and productive rather than meandering into long unproductive discussions with no clear agenda.

Figure 5:
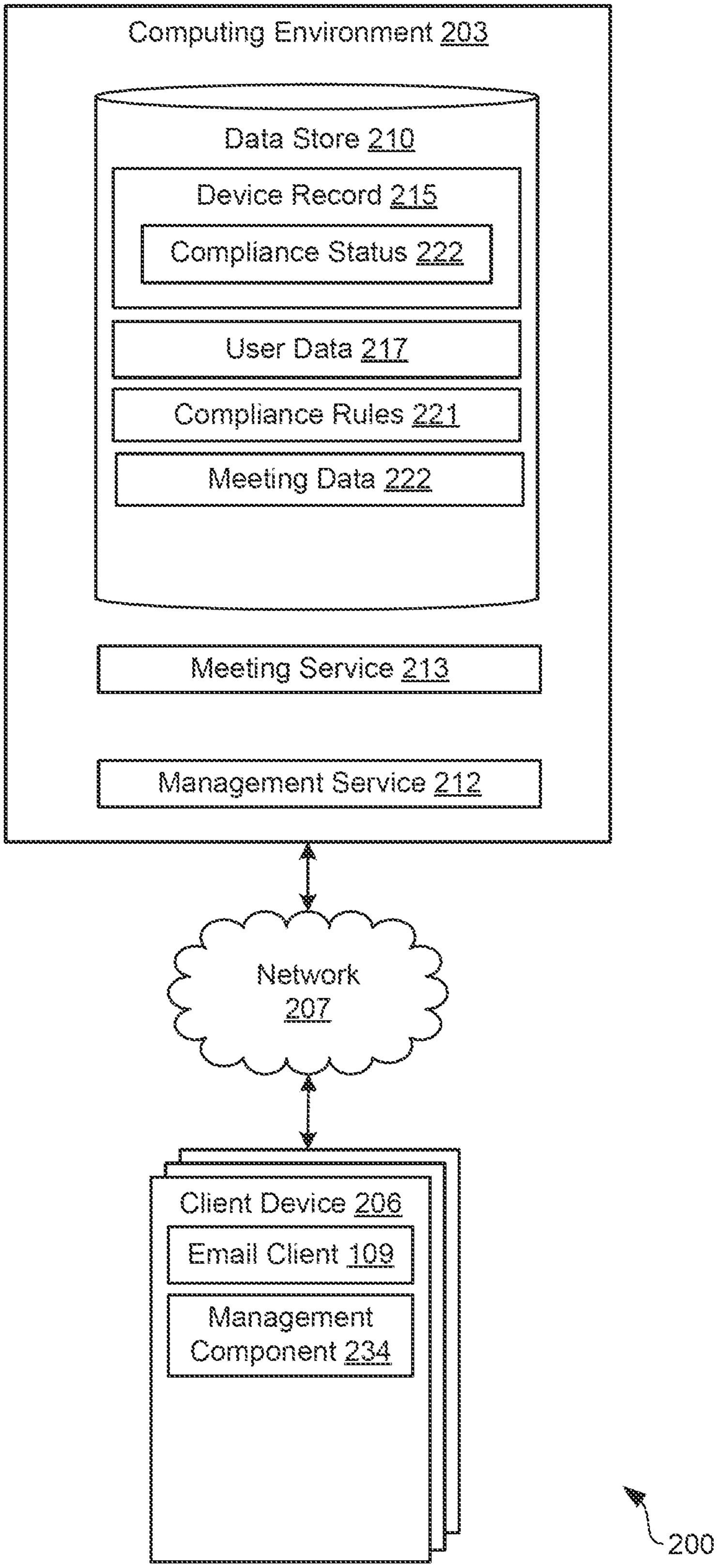
FIG. 5 depicts a networked environment according to various examples of the disclosure.

Referring next to FIG. 5, shown is an example of a networked environment 200 according to examples of the disclosure. In the depicted networked environment 200, a computing environment 203 is in communication with at least one client device 206 over a network 207.

The network 207 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The computing environment 203 can be a computing environment that is operated by an enterprise, such as a business or other organization. The computing environment 203 includes a computing device, such as a server computer, that provides computing capabilities. Alternatively, the computing environment 203 can employ multiple computing devices that are arranged in one or more server banks or computer banks. In one example, the computing devices can be in a single installation. In another example, the computing devices for the computing environment 203 can be distributed among multiple different geographical locations. In one case, the computing environment 203 includes multiple computing devices that together can form a hosted computing resource or a grid computing resource. Additionally, the computing environment 203 can operate as an elastic computing resource where the allotted capacity of computing-related resources, such as processing resources, network resources, and storage resources, can vary over time. In other examples, the computing environment 203 can include or be operated as one or more virtualized computer instances that can be executed to perform the functionality that is described herein.

Various applications or other functionality can be executed in the computing environment 203. Also, various data can be stored in a data store 210 that can be accessible to the computing environment 203. The data store 210 can be representative of a plurality of data stores 210. The data stored in the data store 210 can be associated with the operation of the various applications or functional entities described below.

The components executed on the computing environment 203 can include a management service 212, a meeting service 213, and other applications, services, processes, systems, engines, or functionality not discussed in detail herein. The management service 212 can be executed in the computing environment 203 to monitor and oversee the operation of one or more client devices 206 by administrators. In some examples, the management service 212 can represent one or more processes or applications executed by an enterprise mobility management (EMM) provider that facilitates administration of client devices 206 of an enterprise that are enrolled with the EMM provider. To this end, the operating system and application ecosystem associated with the client device 206 can provide various APIs and services that allow client devices 206 to be enrolled as managed devices with the management service 212. The management service 212 can initiate installation of applications as managed applications. The management service 212 can also initiate installation of configuration profiles that can be accessed by certain applications installed on a client device 206.

The management service 212 can include a management console that can allow administrators to manage client devices 206 that are enrolled with the management service 212. User interfaces can allow an administrator to define policies for a user account or devices associated with an enterprise environment. The user interfaces can also include, for example, presentations of statistics or other information regarding the client devices 206 that can be managed by the management service 212.

The meeting service 213 can be executed to automatically generate meetings for user groups participating in an email thread based upon user votes obtained from the user group. The meeting service 213 can also generate a meeting invitation that can be sent via email or a calendar service to respective users within the user group. The meeting service 213 can select a meeting time based upon user availability by accessing respective user calendars, when authorized to do so. The meeting service 213 can also select a meeting time based upon user participation in the email thread. The meeting service 213 can also dynamically generate a meeting agenda that can be attached to a meeting invitation that is sent to the user group. The meeting invitation can be based upon user feedback received as a part of user votes or based upon an analysis of email within the email thread.

The data stored in the data store 210 can include device records 215, user data 217, compliance rules 221, and potentially other data. Device records 215 can include correspond to client devices 206 that are enrolled as managed devices with the management service 212. A device record 215 can include various security settings selected for enforcement on a client device 206 that is enrolled with the management service 212. Accordingly, a device record 215 can include a device identifier associated with a device, such as the client device 206, one or more device certificates, a meeting data 222, and other data. In some examples, a device record 215 can also identify a user associated with a particular client device 206. The meeting data 222 can indicate whether a particular client device 206 is in compliance with one or more compliance rules 221.

A device record 215 can also store other device specific information, such as a device type, operating system type or version, applications that are required or optional for the device, or an enrollment status of the device. In this scenario, the device record 215 can also indicate whether a managed device is a computing device or a peripheral device, such as a printer, scanner, or other device that can be deployed in an environment and associated with a record in a directory service.

A meeting data 222 of a client device 206 represents whether the device is in compliance with one or more compliance rules 221. Various compliance rules 221 can be enforced by the management service 212 by the client device 206. The meeting data 222 can be determined by a management component 234 on the client device 206 that analyzes the status of the client device 206 and reports compliance to the management service 212. In other examples, the meeting data 222 can be determined by the management service 212 based upon information about the status of the client device 206 that is reported by the management component 234.

User data 217 contains information about users who are associated with client devices 206 that are enrolled with the management service 212. User data 217 can include profile information about a user, authentication information about a user, applications that are installed on client devices 206 associated with the user, and other user information. For example, user data 217 can include information about client devices 206 that are associated with a user account of the user, enterprise resources to which a particular user has access, such as email, calendar data, documents, media, applications, network sites, or other resources. The user data 217 can also identify one or more directory groups of which a particular user is a member, which can in turn define the access rights of the user to one or more enterprise resources as well as identify which applications should be deployed to a client device 206 associated with the user. To this end, the user data 217 can further identify one or more device identifiers that can uniquely identify client devices 206 that are associated with a user account of the user.

The user data 217 can include authentication tokens or other access tokens with which the meeting service 213 can access email or calendar data of a user. In some examples, the email or calendar data of a user is hosted by a third-party email and/or calendar service, and the meeting service 213 can utilize such a token to access the email or calendar of the user.

Meeting data 222 can include data regarding meetings generated by the compliance rules 221 on behalf of users. Meeting data 222 can include information about the users in a user group who are invited to a meeting, information about an agenda generated for the meeting, and scheduling information about the meeting. In some examples, the meeting data 222 can also be stored in a calendar account associated with the enterprise. For example, a user or resource within a directory that is associated with the meeting service 213 can be created with the ability to generate meeting invitations that can be sent via email.

The meeting data 222 can also include data about user votes that are obtained from users about whether to schedule a meeting related to an email thread. The meeting data 222 can also include information submitted by users along with user votes from which a meeting agenda can be generated. Meeting data 222 can further include information about user participation in the email thread. For example, the meeting service 213 can store emails from the email thread or an indication of participation in an email thread as reported by the email client 109 or by accessing user email accounts using user data 217, such as an authentication token or a permission granted by the user or administrator to access the email of a particular user or user group.

The client device 206 can represent multiple client devices 206 coupled to the network 207. The client device 206 includes, for example, a processor-based computer system. According to various examples, a client device 206 can be in the form of a desktop computer, a laptop computer, a personal digital assistant, a mobile phone, a smartphone, or a tablet computer system. The client device 206 can represent a device that is owned or issued by the enterprise to a user, or a device that is owned by the user. The client device 206, when provisioned, can be enrolled with the management service 212 as a managed device of the enterprise.

The client device 206 can execute a management component 234 that can communicate with the management service 212 to facilitate management of the client device 206. The management component 234 can communicate with the management service 212 to enforce management policies and compliance rules on the client device 206. For example, the management component 234 can enforce data security requirements, install, remove or update security certificates, or write, modify or delete certain data from the client device 206. The management component 234 can also monitor network activity of the client device 206, the location of the client device 206, enforce password or personal identification number (PIN) requirements, or any other security or acceptable-use policies that are defined in the management service 212 and sent to the management component 234 over the network 207.

To carry out local management of a client device 206, the management component 234 can be installed and executed with elevated or administrative privileges on the client device 206. In some scenarios, the operating system can allow a particular application or package to be identified as a device owner or a device administrator.

The email client 109 can also be installed on the client device 206. In some cases, the functionality of the meeting service 213 can be integrated within the email client 109. The email client 109 can generate user interfaces that solicit user votes from users in a user group participating in an email thread. The email client 109 can also obtain additional information or feedback from users that can be utilized to generate a meeting agenda for meetings generated by the meeting service 213.

Examples of the disclosure operate by detecting an email thread in an email client 109 or in an email data store, such as in an email service hosted by the enterprise or a third-party service. A user group, or an identity of the participants in the email thread, can be identified by the meeting service 213. Users can be identified within the email thread by email address.

The meeting service 213 can predict an appropriate time in an email thread to schedule a face-to-face meeting or virtual meeting. The meeting service 213 can also generate a corresponding meeting agenda that can be included as an attachment to a meeting event that is generated within an email or calendar service. Additionally, the meeting service 213 can continuously receive inputs from a user group participating in an email thread and generate a meeting invitation when an optimal meeting probability is achieved.

During an ongoing email thread, when the length of the email thread meets or exceeds a certain threshold, which can be calculated in terms of a quantity of emails exchanged in the email thread, the meeting service 213 or email client 109 can cause a vote user interface element 117 to be displayed within an email client 109 to the user. In one example, the email client 109 can make such a determination. In another example, the meeting service 213 can make the determination and instruct the email client 109 to display a vote user interface element 117 to users when the user views additional emails from the email thread. In one example, the threshold can be dynamically determined for individual participants based on their past usage history. For example, users who tend to vote for a meeting earlier in an email thread can be presented with the vote user interface element 117 earlier than another user who tends to vote to a meeting later in the email thread.

The vote user interface element 117 can comprise an interactive questionnaire for each of the users within or adjacent to the email thread or emails in the email client. The vote user interface element 117 can include one or more prepopulated questions about whether the user believes it is the right time to create a meeting.

For example, the vote user interface element 117 can present a question such as “Would you like to schedule a meeting to discuss this email thread?” The vote user interface element 117 can also include prepopulated responses that the user can select, such as “Too early,” “Early, but would like clarity on certain aspects,” “Optimal,” or “Long overdue.” The user can select one of the responses, and the user vote can be provided to the meeting service 213.

Individual responses of each of the users can be recorded by the vote user interface element 117. A meeting score can be generated that represents the likelihood that it is the optimal time to suggest or schedule a meeting. The meeting service 213 can give special focus to participants who are active participants or have been explicitly tagged or mentioned in the email thread. For example, a vote from a user who has replied to the email thread or a user who is tagged or mentioned can be weighted more heavily than a user who has failed to reply to the email thread or is not mentioned. As another example, the meeting service 213 can also give special focus to participants who are higher ranked in an organizational hierarchy according to a directory service or another organizational chart accessible to the meeting service 213.

If or when a user selects any of the prepopulated responses, a supplementary questionnaire or input field can also be shown to the user by the vote user interface element 117. The meeting service 213 can generate a meeting agenda for a subsequent meeting using responses provided by users via the vote user interface element 117.

For example, if a user selects the option “Too Early” in the vote user interface element 117, there are no supplementary questionnaires or input fields shown to the user. However, if the user selects another response option in the vote user interface element 117, additional options can be shown to the user to provide comments or additional context for their responses. For example, the user can be provided with an input field to add any points on which they would want further clarity or information. These points are accordingly added to the meeting agenda if a threshold percentage of other users in the user group vote to hold a meeting. As another example, the user can be provided with input fields to add any new points they would like to discuss and are also allowed to upvote on points already added by other participants to the probable meeting agenda generated by the meeting service 213.

Examples of the disclosure can utilize machine learning techniques to detect keyword and/or phrases extracted from the email discussion to generate or augment a meeting agenda that can be generated for a meeting. Participants can add items to the probable meeting agenda through the course of the email thread based upon their replies to the email thread or information submitted via the vote user interface element 117. Participants can also upvote on items already added by other participants or added automatically by the meeting service 213. Highly upvoted agenda items can result in these items being added to the auto-generated meeting agenda by the meeting service 213. In another example, the meeting service 213 can generate a meeting agenda that allocates time slices of the meeting to each item on the meeting agenda. Time slices can be edited by participants for a meeting agenda created by the meeting service 213 that circulated to users in the user group. Additionally, users can add items to a meeting agenda circulated to users in the user group by editing the document. Thus, during an ongoing email thread, the meeting service 213 continually records the responses of the participants and adjusts the meeting agenda based upon these responses.

The meeting service 213 can also generate a meeting time based upon availability of users of the user group associated with an email thread. The meeting service 213 can access a calendar of the user to determine user availability. In one example, the meeting service 213 can utilize a weighted solution in which the availability of users who have replied to the email thread is more highly weighted in determining user availability to schedule a meeting. Recognizing that in certain email threads, there may not be a time in which all users are available, the meeting service 213 can prioritize setting a meeting time when users are available who are actually participating in the email thread by replying.

As another example, the availability of users who have been tagged or referred to in the email thread can be prioritized in setting a meeting time. As another factor, availability of higher-ranking employees according to a user directory can also be prioritized in setting a meeting time. In this way, the meeting service 213 can arrive at a meeting time that prioritizes a subset of participants who can be considered important or essential to the meeting are more likely to be available.

The functionality of the meeting service 213 can be integrated into an email client 109 or executed remotely from an email client 109. In one implementation, the meeting service 213 can be integrated into an email server or an email hosting site that users can utilize to access their respective email. In another implementation, the functionality of the meeting service 213 can be provided as a plug-in or extension that can be installed on an email client 109 or browser that provides plug-in or extension capability.

Figure 6:
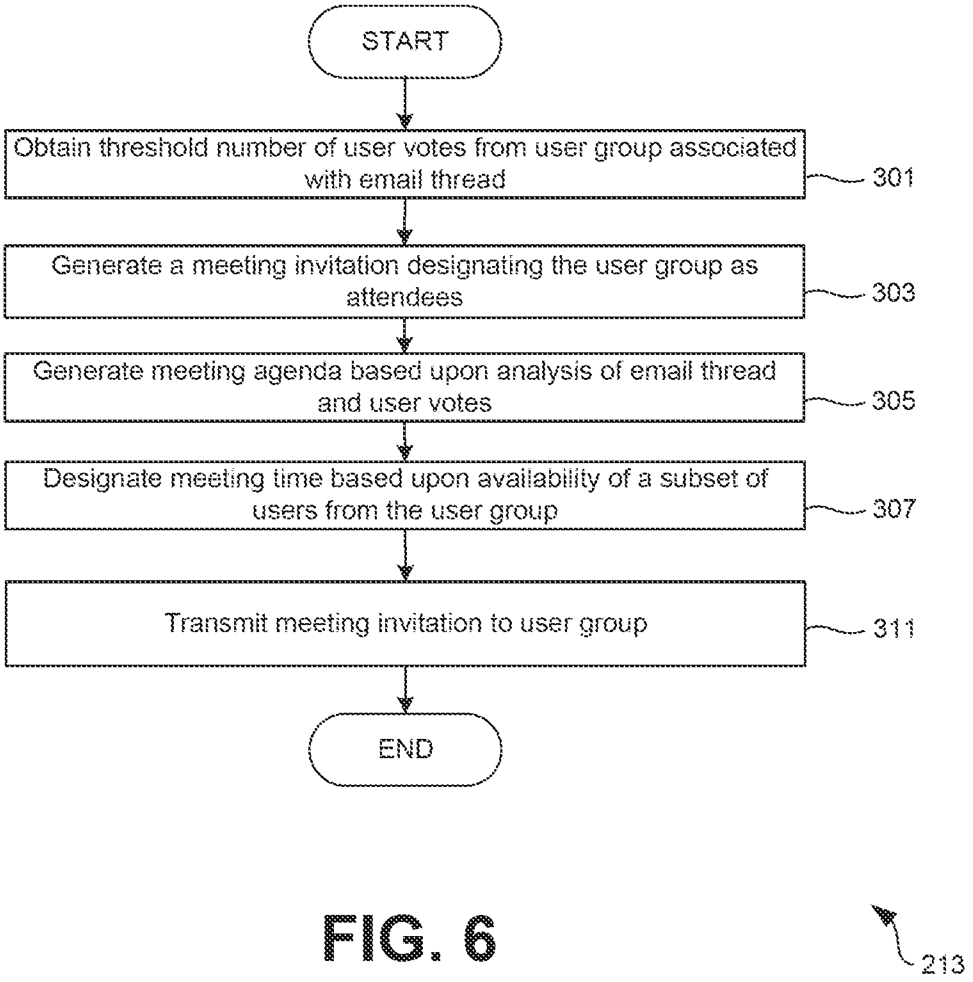
FIG. 6 is a flowchart illustrating functionality according to various examples of the disclosure.

Referring next to FIG. 6, shown is a flowchart that provides one example of how the meeting service 213 can generate a meeting invitation based upon an analysis of an email thread according to examples of the disclosure.

First, at step 301, the meeting service 213 can obtain a threshold number of user votes from a user group associated with an email thread. The threshold number of user votes can comprise votes that are in favor of creating a meeting to discuss or resolve topics associated with the email thread. The threshold can be selected based upon the number of emails in the email thread. For example, the threshold can comprise a minimum percentage of users in the user group. As another example, the threshold can be based on the number of emails in the email thread as well as the number of users in the user group.

At step 303, the meeting service 213 can generate a meeting invitation designating the user group as attendees of the meeting. The meeting service 213 can generate a meeting invitation in an email or calendar service associated with an enterprise. In one example, the meeting invitation can designate an originator of the email thread as a sender or organizer of the meeting. In another example, the meeting service 213 can designate another entity in a user directory, such as a meeting bot or a meeting assistant, as the meeting organizer. The meeting service 213 can store the meeting invitation as a draft email or draft meeting invitation in meeting data 222 in the data store 210. The meeting service 213, in subsequent steps, can augment the meeting invitation and determine a meeting time of the meeting based upon additional analysis of the email thread and user votes obtained from the user group.

At step 305, the meeting service 213 can generate a meeting agenda for the meeting invitation generated at step 303. The meeting agenda can be generated as a document or file that can be attached to the meeting invitation or inserted as text, image, and other content directly into an email or other message that can be sent along with a meeting invitation to users in the user group.

The meeting service 213 can incorporate feedback from user-submitted votes to augment or generate the meeting agenda. For example, if or when a user selects any of the prepopulated responses, a supplementary questionnaire or input field can also be shown to the user by the vote user interface element 117. The meeting service 213 can generate a meeting agenda for a subsequent meeting using responses provided by users via the vote user interface element 117. In one example, user feedback provided along with user votes can be pasted into the meeting agenda. In another example, certain keywords or phrases from user feedback can be incorporated into a meeting agenda.

A user can be provided with an input field to submit along with user votes to add any points on which they would want further clarity or information. These points are accordingly added to the meeting agenda if a threshold percentage of other users in the user group vote to hold a meeting. As another example, the user can be provided with input fields to add any new points they would like to discuss and are also allowed to upvote on points already added by other participants to the probable meeting agenda generated by the meeting service 213.

Examples of the disclosure can also utilize machine learning techniques or to detect keyword and/or phrases from the email discussion to generate or augment a meeting agenda that can be generated for a meeting. The meeting service 213 can add items to the meeting agenda based upon an analysis of emails and replies to the email thread or information submitted via the vote user interface element 117. In one example, the meeting service 213 can cause a user interface to be generated that allows users to vote on items already added to the meeting agenda by the meeting service 213. Highly upvoted agenda items can result in these items being added to the auto-generated meeting agenda by the meeting service 213. In another example, the meeting service 213 can generate a meeting agenda that allocates time slices of the meeting to each item on the meeting agenda. Thus, during an ongoing email thread, the meeting service 213 continually records the responses of the participants and adjusts the meeting agenda based upon these responses.

The meeting service 213 can also allocate time slices or a speaking slot of the meeting on the meeting agenda to users based upon whether the user has replied to the email thread. Users who have replied to the email thread more than other users or with more content in their respective reply than other users can be assigned more time in a speaking slot on the agenda than users who have replied with less content or who have not replied to the email thread. In other words, speaking slot can be determined based upon a degree of engagement with the email thread relative to other users in the email thread.

At step 307, the meeting service 213 can designate a meeting time based upon availability of at least a subset of users from the user group on the email thread. Recognizing that it can be difficult to select a meeting time where all users are available, the meeting service 213 can select a meeting time based upon an availability analysis of users and an engagement level of users with the email thread. The meeting service 213 can assess user availability by accessing a user calendar of the user assuming the meeting service 213 has been granted permission to access a user calendar by the users or an administrator.

The analysis can consider various factors. For example, the availability of users who have replied to the email thread or the user creating the email thread can be prioritized over users who have not replied to the email thread. In some examples, the meeting service 213 can consider whether a user has read one or more emails from the email thread. In one example, users who have not read emails from the meeting service 213 can be deprioritized for meeting availability purposes because they can be considered less engaged in the email thread. As another factor, users who have voted in favor of creating the meeting can be prioritized when selecting meeting availability over users who have not voted in favor of creating the meeting.

In one implementation, the availability of users who have not replied to the email thread or who have not voted in favor of setting a meeting can be ignored when setting a meeting time for the meeting. The meeting time can be chosen within a configurable time window after the first email in the email thread or after the last reply to the email thread. For example, the meeting time can be chosen within a week of the first email or the last reply to the email thread.

The meeting service 213 can access the emails in the email thread using an authentication token or an authentication indication provided by a user that authorizes the meeting service 213 to access a respective user's email. In another example, the email client 109 can provide the contents of an email or an email thread to the meeting service 213. In one scenario, the contents of an email can be provided to the meeting service 213 when a user votes on whether to set a meeting via a vote user interface element 117.

At step 311, the meeting invitation that is generated by the meeting service 213 can be transmitted to the user group associated with the email thread. In other words, the meeting invitation can be sent to the users on the email thread. Thereafter, the process can proceed to completion.

The flowchart of FIG. 6 shows examples of the functionality and operations described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart of FIG. 6 shows a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 206, computing environment 203, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 212, meeting service 213, email client 109, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing from the spirit and principles of the disclosure. All of these modifications and variations are intended to be included herein within the scope of this disclosure.

What is claimed is:

1. A system, comprising:

at least one computing device comprising a processor and a memory; and a meeting service executable by the at least one computing device, the meeting service causing the at least one computing device to at least:

receive, over a network, an authentication token from each client device of a user group, the authentication token granting the meeting service access to email content of an email client on said each client device;

select an email thread associated with the user group from the email content accessed using the authentication token;

detect that a threshold number of email messages has been sent by the user group in the email thread;

in response to the detection, determine to solicit a user vote for scheduling a meeting associated with the email thread from the user group;

send instructions to the client device of each user in the user group to display a vote solicitation user interface element on the email client of the client device upon a subsequent access of the email thread, the vote solicitation user interface element configured to solicit the user vote on whether to schedule the meeting;

obtain a plurality of user votes from the client devices of the user group;

compute relative priority weights for each user in the user group based on engagement metrics comprising a reply frequency and read status within the email thread;

determine, from the plurality of user votes weighted using the computed relative priority weights, whether to schedule the meeting for the user group when a threshold percentage of the weighted user votes indicate that the meeting should be scheduled;

generate a meeting invitation in a calendar service, wherein the meeting invitation designates respective users from the user group as attendees;

generate a meeting agenda corresponding to the meeting invitation, wherein the meeting agenda is associated with the meeting invitation as an attachment;

determine a meeting time for the meeting based on the relative priority weights of the users in the user group, wherein the meeting time is determined by computing overlapping availability windows using schedules of the users in the calendar service, wherein, in determining the meeting time, availability of the users with higher engagement metrics is assigned a higher priority when selecting the overlapping availability window; and cause the meeting invitation including the meeting time and the meeting agenda to be sent to the user group.

2. The system of claim 1 wherein the email client generates the vote solicitation user interface element in response to a respective user of the user group accessing the email thread on the email client.

3. The system of claim 1, wherein the meeting service generates the meeting agenda based upon at least one of: a plurality of phrases extracted from the email thread or user-submitted comments associated with the user votes.

4. The system of claim 1, wherein the meeting service generates the meeting agenda by inserting a speaking slot in the meeting agenda for respective users from the user group based upon the engagement metrics of the respective users detected in the email thread.

5. A method, comprising:

receiving, by a meeting service over a network, an authentication token from each client device of a user group, the authentication token granting the meeting service access to email content of an email client on said each client device;

selecting an email thread associated with the user group from the email content accessed using the authentication token;

detecting that a threshold number of email messages has been sent by the user group in the email thread;

in response to the detection, determining to solicit a user vote for scheduling a meeting associated with the email thread from the user group;

sending instructions to the client device of each user in the user group to display a vote solicitation user interface element on the email client of the client device upon a subsequent access of the email thread, the vote solicitation user interface element configured to solicit the user vote on whether to schedule the meeting;

obtaining a plurality of user votes from the client devices of the user group;

computing relative priority weights for each user in the user group based on engagement metrics comprising at least a reply frequency and read status within the email thread;

determining, from the plurality of user votes weighted using the computed relative priority weights, whether to schedule the meeting for the user group when a threshold percentage of the weighted user votes indicate that the meeting should be scheduled;

generating a meeting invitation in a calendar service, wherein the meeting invitation designates respective users from the user group as attendees;

generating a meeting agenda corresponding to the meeting invitation, wherein the meeting agenda is associated with the meeting invitation as an attachment;

determining a meeting time for the meeting based on the relative priority weights of the users in the user group, wherein the meeting time is determined by computing overlapping availability windows using schedules of the users in the calendar service, wherein, in determining the meeting time, availability of the users with higher engagement metrics is assigned a higher priority when selecting the overlapping availability window; and causing the meeting invitation, including the meeting time and the meeting agenda, to be sent to the user group.

6. The method of claim 5, wherein the email client generates the vote solicitation user interface element in response to a respective user of the user group accessing the email thread on the email client.

7. The method of claim 5, wherein generating the meeting agenda is based upon at least one of: a plurality of phrases extracted from the email thread or user-submitted comments associated with the user votes.

8. The method of claim 5, wherein generating the meeting agenda further comprises inserting a speaking slot in the meeting agenda for respective users from the user group based upon the engagement metrics of the respective users detected in the email thread.

9. A non-transitory computer-readable medium comprising machine-readable instructions, wherein when executed by a processor of a computing device, the machine-readable instructions cause the computing device to at least:

receive, by a meeting service over a network, an authentication token from each client device of a user group, the authentication token granting the meeting service access to email content of an email client on said each client device;

select an email thread associated with the user group from the email content accessed using the authentication token;

detect that a threshold number of email messages has been sent by the user group in the email thread;

in response to the detection, determine to solicit a user vote for scheduling a meeting associated with the email thread from the user group;

send instructions to the client device of each user in the user group to display a vote solicitation user interface element on the email client of the client device upon a subsequent access of the email thread, the vote solicitation user interface element configured to solicit the user vote on whether to schedule the meeting;

obtain a plurality of user votes from the client devices of the user group;

compute relative priority weights for each user in the user group based on engagement metrics comprising at least a reply frequency and read status within the email thread;

determine, from the plurality of user votes weighted using the computed relative priority weights, whether to schedule the meeting for the user group when a threshold percentage of the weighted user votes indicate that the meeting should be scheduled;

generate a meeting invitation in a calendar service, wherein the meeting invitation designates respective users from the user group as attendees;

generate a meeting agenda corresponding to the meeting invitation, wherein the meeting agenda is associated with the meeting invitation as an attachment;

determine a meeting time for the meeting based on the relative priority weights of the users in the user group, wherein the meeting time is determined by computing overlapping availability windows using schedules of the users in the calendar service, wherein, in determining the meeting time, availability of the users with higher engagement metrics is assigned a higher priority when selecting the overlapping availability window; and cause the meeting invitation, including the meeting time and the meeting agenda, to be sent to the user group.

10. The non-transitory computer-readable medium of claim 9, wherein the email client generates the vote solicitation user interface element in response to a respective user accessing the email thread on the email client.

11. The non-transitory computer-readable medium of claim 9, wherein the machine-readable instructions generate the meeting agenda based upon at least one of: a plurality of phrases extracted from the email thread or user-submitted comments associated with the user votes.

12. The non-transitory computer-readable medium of claim 9, wherein the machine-readable instructions generate the meeting agenda by inserting a speaking slot in the meeting agenda for respective users from the user group based upon the engagement metrics of the respective users detected in the email thread.

13. The system of claim 1, wherein determining the meeting time further comprises prioritizing the availability of the users who have been tagged or referred to in the email thread.

14. The system of claim 1, wherein the engagement metrics further comprise participation of each user in the email thread, including at least (i) a number of replies posted by the user in the email thread and (ii) a number of messages in the email thread that have been opened by the user on the email client.

15. The method of claim 5, wherein the engagement metrics further comprise participation of each user in the email thread, including at least (i) a number of replies posted by the user in the email thread and (ii) a number of messages in the email thread that have been opened by the user on the email client.

16. The non-transitory computer-readable medium of claim 9, wherein the engagement metrics further comprise participation of each user in the email thread, including at least (i) a number of replies posted by the user in the email thread and (ii) a number of messages in the email thread that have been opened by the user on the email client.

* * * * *